United States Patent [19]

Virdee et al.

[11] Patent Number: 4,879,730

[45] Date of Patent: Nov. 7, 1989

[54] JITTER TOLERANT CIRCUIT FOR DUAL RAIL DATA

[75] Inventors: Nirmal S. Virdee, Phoenix; Hamid R. Baradaran, Glendale, both of Ariz.

[73] Assignee: Siemens Transmission Systems, Inc., Phoenix, Ariz.

[21] Appl. No.: 200,387

[22] Filed: May 31, 1988

[51] Int. Cl.[4] .......................... H03K 5/05; H04L 7/00
[52] U.S. Cl. .................................. 375/106; 307/265; 328/58; 375/118
[58] Field of Search ............... 375/106, 22, 110, 118; 329/104; 307/265, 267; 328/58; 371/63

[56] References Cited

U.S. PATENT DOCUMENTS

| | | | |
|---|---|---|---|
| 4,017,803 | 4/1977 | Baker | 329/104 |
| 4,218,770 | 8/1980 | Weller | 375/118 |
| 4,694,340 | 9/1987 | Tanaka | 358/154 |
| 4,726,045 | 2/1988 | Caspell et al. | 307/265 |

Primary Examiner—Robert L. Griffin
Assistant Examiner—Marianne Huseman
Attorney, Agent, or Firm—Jeffery P. Morris

[57] ABSTRACT

A retiming circuit is provided which accurately converts half-width dual rail data with up to one unit interval of jitter with respect to the data clock, into full-width data. The circuit is comprised of D-flip-flops and associated logic elements which capture and hold a data pulse until the captured data pulse can be accurately transferred to the next circuit stage by a positive clock transition.

10 Claims, 3 Drawing Sheets

FIG. 1
(PRIOR ART)
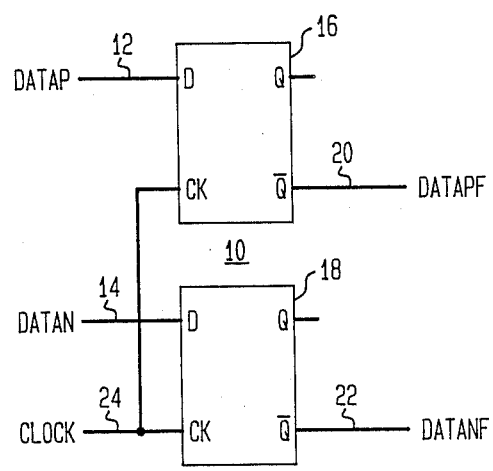
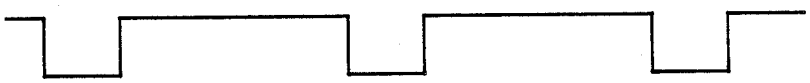
FIG. 2A
DATAP
FIG. 2B
DATAN
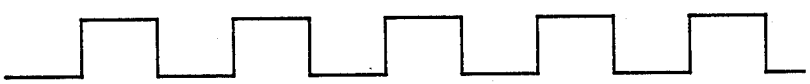
FIG. 2C
CLOCK
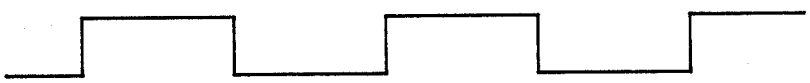
FIG. 2D
DATAPF
FIG. 2E
DATANF

DATAP-1

Q110-1

DATAP-2

Q110-2

DATAP-3

Q110-3

CLOCK

DATAPF

JITTER TOLERANT CIRCUIT FOR DUAL RAIL DATA

BACKGROUND OF THE INVENTION

1. Field of the Invention

The present invention relates generally to jitter tolerant retiming circuits, and specifically to a retiming circuit for accurately converting half-width dual rail data, with as much as one unit interval of data jitter, with respect to the input clock, into full-width signals. The invention is particularly advantageous in clock recovery circuits used in data transmission and in telecommunications transmission equipment.

2. Description of the Prior Art

The use of D-type flip-flops in the prior art to convert from half-width data to full-width data is well known. In such prior art circuits, a positive edge triggered D-type flip-flop is used to retime and convert half-width data on each rail (input data line) to full-width data. The half-width data is coupled to the D-input of the flip-flop and is clocked to the output of the flip-flop by the rising edge of the clock. For optimum operation of such a prior art circuit, it is required that the positive edge of the clock be in the middle of the data pulse such that error free operation is obtained with a maximum data jitter of plus or minus 0.25 unit interval with respect to the clock input.

A representative example of the prior art is U.S. Pat. No. 4,694,340, which describes prevention of jitter generation in a vertical synchronizing signal separating circuit. Another example of the prior art is U.S. Pat. No. 4,218,770, which describes the recovery of delay modulated data using a clock that is substantially faster than the data rate. Another example of the prior art is U.S. Pat. No. 4,017,803, which uses phase-lock loop techniques to maintain a desired relationship between data and the recovered clock.

Retiming circuits of the known prior art do not operate error-free when data jitter of 0.5 unit interval (UI) is present, hence such prior art retiming circuits must be configured to be very precise or to include additional circuitry to ensure that the input data and clock signals remain within 0.5 unit interval.

It is therefore an objective of the present invention to provide a retiming circuit that avoids the aforementioned disadvantages of the prior art, and enables an amplitude of jitter greater than 0.5 unit interval to be tolerated and accomodated without unnecessarily complex and costly circuitry.

SUMMARY OF THE INVENTION

A retiming circuit is provided which accurately converts half-width dual rail data with up to one unit interval of jitter with respect to the data clock, into full-width data. The circuit is comprised of D-flop-flops and associated logic elements which capture and hold a data pulse until the captured data pulse can be accurately transferred to the next circuit stage by a positive clock transition.

The aforementioned objectives and advantages of the invention will become apparent with reference with the accompanying drawings and detailed description thereof, wherein:

BRIEF DESCRIPTION OF THE DRAWINGS

FIG. 1 illustrates a retiming and half-width to full-width data conversion circuit of the known prior art.

FIGS. 2(a) to 2(e) are waveform diagrams useful in understanding the operation of the prior art retiming circuit of FIG. 1.

DESCRIPTION OF THE PREFERRED EMBODIMENT

FIG. 1 shows a prior art retiming and half-width to full-width conversion circuit generally at 10. Two rail positive and negative data inputs on DATAP rail 12 and DATAN rail 14 respectively are coupled to the data inputs of flip-flops 16 and 18 and are clocked out on DATAPF and DATANF lines 20 and 22 by the positive edge of a clock on CLOCK line 24.

As is apparent with reference to FIG. 2, wherein FIG. 2(a) shows a DATAP and FIG. 2(b) shows a DATAN pulse (the two rail data), the positive edge of the CLOCK of FIG. 2(c) must be within the data pulse for the data signals to be properly decoded. The set-up and hold times of the flip-flops are guard bands. FIGS. 2(d) and 2(e) show the full width positive and negative data output on lines 18 and 20 respectively. The aforementioned prior art circuit will tolerate a maximum of 0.5 UI of data jitter with respect to the CLOCK signal.

Figure 3:
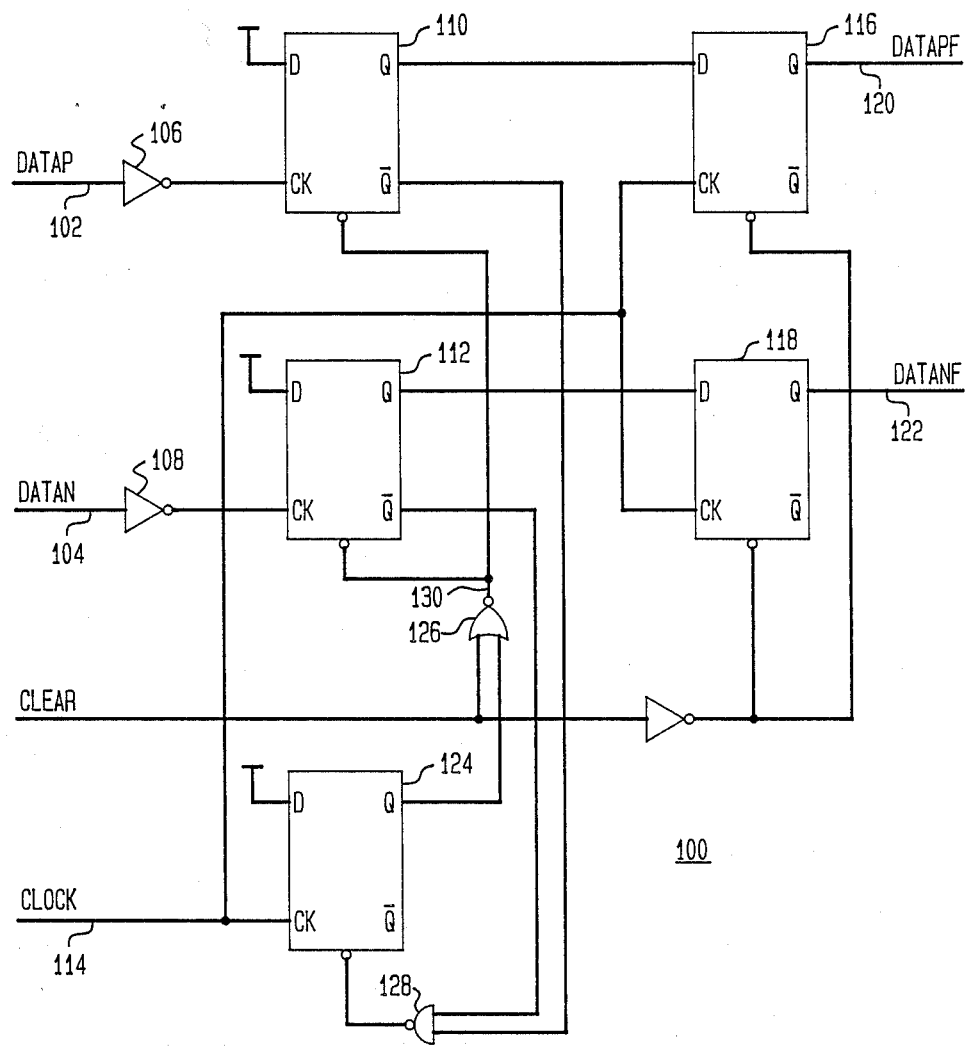
FIG. 3 illustrates a timing and half-width to full-width data conversion circuit in accordance with the present invention.

Referring now to FIG. 3, a retiming and half-width to full-width conversion circuit in accordance with the present invention is illustrated generally at 100. Input data signals DATAP on line 102 and DATAN on line 104 are inverted by inverters 106 and 108 respectively such that the leading edges of the signals coupled to the clock inputs of D-flip-flops 110 and 112 will clock a logic high to the Q outputs of flip-flops 110 and 112. Subsequently, as soon as a positive clock edge from the clock on line 114 arrives, the data which has been coupled from the Q outputs of flip-flops 110 and 112 to the data D inputs of flip-flops 116 and 118 is transferred to the Q outputs of the flip-flops 116 and 118 as full width positive and negative data pulses DATAPF and DATANF on lines 120 and 122 respectively. The same positive clock edge which effected the aforementioned data transfer generates a pulse from flip-flop 124, NOR gate 126 and NAND gate 128, which appears on line 130 and clears flip-flops 110 and 112, thereby preparing these cleared flip-flops to receive more data. The RESET signal on line 132 allows all of the storage elements to be cleared asynchronously at any time.

Figure 4A:
FIGS. 4(a) to 4(h) are waveform diagrams useful in understanding the operation of the invention of FIG. 3.
Figure 4B:
Figure 4C:
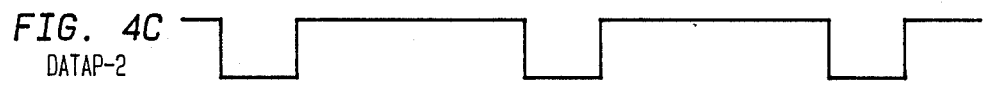
Figure 4D:
Figure 4E:
Figure 4F:
Figure 4G:
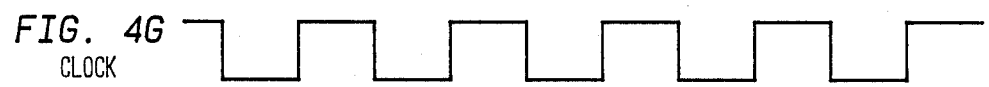
Figure 4H:

The waveforms of FIG. 4(a) through 4(b) illustrate how the same full-width DATAPF output is generated by circuit 100 from three different data and clock relationships at the flip-flop 110 input. The foregoing is possible because flip-flops 112 and 110 hold the data until a positive clock edge is seen at flip-flop 124, at which time the captured data is transferred to the output and flip-flops 110 and 112 are cleared. Since the D type flip-flops have finite set-up time, hold time and propagation delay, as do the various inverters and gates, the actual amplitude of data jitter that is tolerable without error will vary slightly with the operating frequency and with the circuit technology employed, e.g., for 2-micron CMOS gate array technology, 1.0 UI of jitter is acceptable at several KHz, while about 0.9 UI of jitter is acceptable at several MHz. The aforementioned tolerable jitter levels far exceed the capabilities of the described prior art, and enable the retiming circuit described herein to operate accurately at jitter levels at which the prior art cannot operate accurately, without additional complex jitter compensation circuitry.

While the present invention has been described in connection with a preferred embodiment thereof, it is to be understood that additional embodiments, modifications and applications which will become apparent to those skilled in the art are included within the spirit and scope of the invention as set forth by the claims appended hereto.

We claim:

1. A data timing circuit for converting half-width input data on a pair of data input lines into a full-width data output, comprising:

first and second flip-flop means for receiving said input data from said input lines respectively at clock inputs of said flip-flop means and having data outputs;

means for adapting said clock inputs of said first and second flip-flop means such that the leading edges of said input data clocks logic high pulses to the data outputs of said first and second flip-flop means;

pulse generation means receiving a train of clock pulses, for generating a reset pulse on the next positive clock edge occurring after said leading edges of said input data clocks logic high pulses to the data outputs of said first and second flip-flop means, to enable said first and second flip-flop means to receive further data input;

third and fourth flip-flop means having data inputs coupled to the data outputs of said first and second flip flops, whereby said data coupled to data inputs of said, third and fourth flip-flops is outputted to the data outputs thereof as full-width data by said next positive clock edge; and means for clocking said pulse generation means with a clock signal such that jitter present in said input data having greater than one half a data unit interval but less than one data unit interval with respect to said clock signal does not cause error in said transfer of data and resetting of said flip-flops.

2. A data timing circuit in accordance with claim 1 wherein said input data transferred by said positive clock pulse is in the presence of greater than one half data unit interval of jitter in said input data with respect to said clock without error introduction into the data caused by said jitter.

3. A data timing circuit in accordance with claim 1 wherein said first, second, third and fourth flip-flop means are D-type flip-flops implemented in CMOS technology.

4. A data timing circuit in accordance with claim 1 wherein said means for adapting the clock inputs of said first and second flip-flop means includes an inverter means for inverting said input data.

5. A data timing circuit in accordance with claim 1 wherein said pulse generation means comprises:

fifth flip-flop means for receiving said input clock;

NOR gate means for combining the data output of said fifth flip-flop and a reset pulse to provide the generated reset pulse to said first and second flip-flop means; and NAND gate means for combining the inverted data outputs of said first and second flip-flop means to provide a reset pulse for said fifth flip-flop means.

6. A data timing circuit in accordance with claim 1, wherein said first and second flip-flop means are reset asynchronously by said generated reset pulse.

7. A method for converting half-width input data on a pair of data input lines into a full-width data output, comprising the steps of:

receiving said input data from said input lines respectively at clock inputs of flip-flop means;

adapting said flip-flop means such that the leading edges of said input data clocks a logic high pulse to the data outputs of said flip-flop means;

generating a reset pulse on the next positive clock edge of a received train of clock pulses immediately following the occurrence of said logic high pulse, to enable said flip-flop means to receive further data input, by means of the generated reset pulse;

transferring said input data to the data outputs of additional flip-flop means as full-width data by said next positive clock edge; and clocking said reset pulse with a clock signal such that jitter in said input data of greater than one half a data unit interval but less than one data unit interval with respect to said clock signal does not cause error in said transferring of data and resetting of said flip-flop means and additional flip-flops means.

8. A method in accordance with claim 7 wherein said input data transferred by said positive clock pulse is in the presence of greater than one half data unit interval of jitter in said input data with respect to said clock without error introduction into the data caused by said jitter.

9. A method in accordance with claim 7 including the further step of inverting said input data.

10. A method in accordance with claim 7, wherein said flip-flop means and additional flip-flop means reset asynchronously by said generated reset pulse.

* * * * *